UNITED STATES PATENT OFFICE.

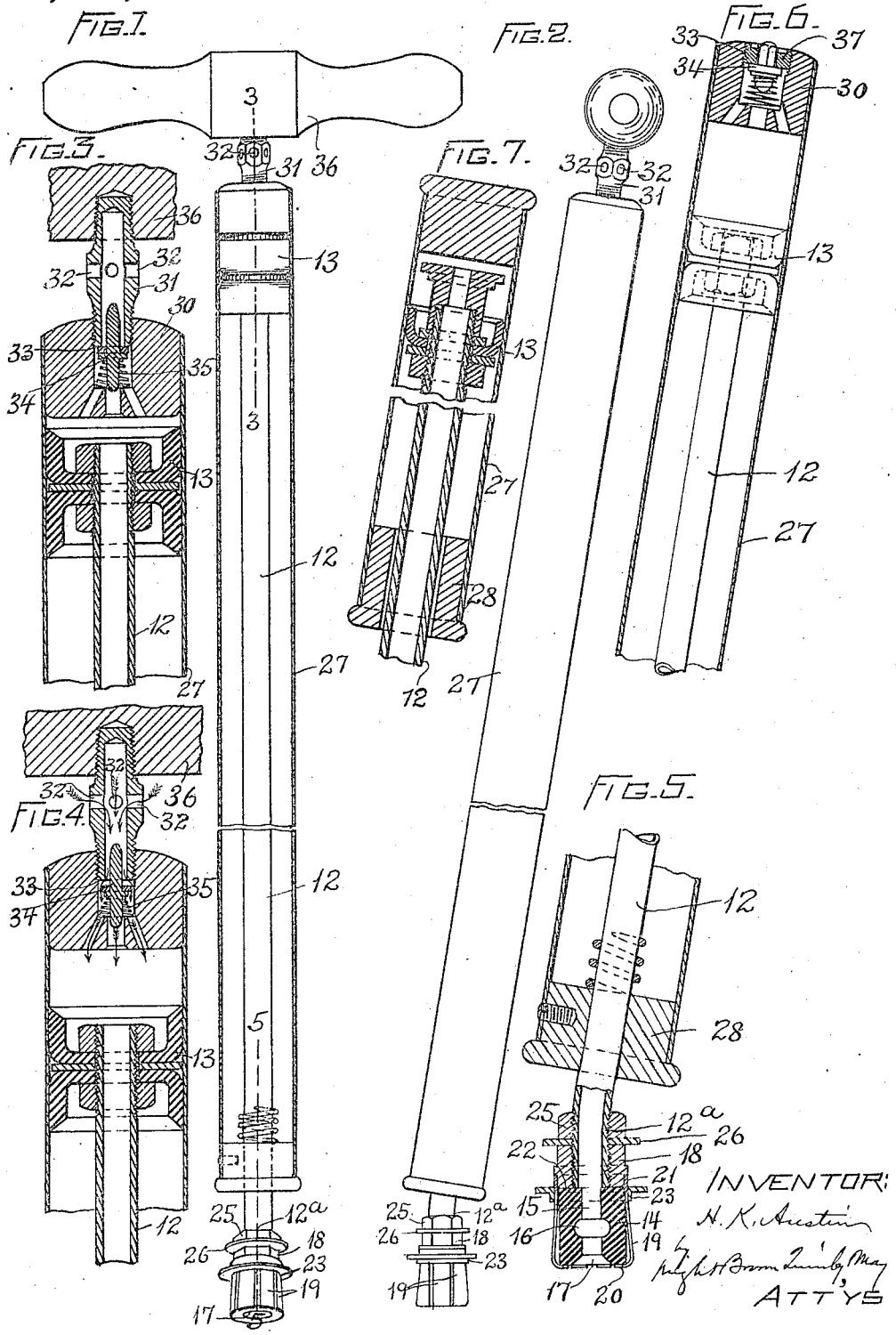

HENRY K. AUSTIN, OF READING, MASSACHUSETTS.

TIRE-INFLATING PUMP.

1,304,930. Specification of Letters Patent. Patented May 27, 1919.

Application filed August 18, 1917. Serial No. 186,872.

*To all whom it may concern:*

Be it known that I, HENRY K. AUSTIN, a citizen of the United States, residing at Reading, in the county of Middlesex and State of Massachusetts, have invented new and useful Improvements in Tire-Inflating Pumps, of which the following is a specification.

This invention relates to a hand-operated tire inflating pump which includes a barrel, a piston, a piston rod, and a valve-engaging air outlet through which air is forced by the operation of the pump into a tire valve, said outlet being provided with an elastic tubular bushing or coupling adapted to receive and have an air-tight engagement with the portion of the valve which projects inwardly from the rim of a pneumatic-tired wheel, the pump being so organized that it is adapted to inflate a tire when the said valve portion is upstanding or in a vertical position projecting upwardly from the lower portion of the wheel rim. The organization is also such that the pump barrel is arranged at an obtuse angle relatively to the valve-engaging air outlet, so that the member of the pump which is reciprocated by the operator may be inclined outwardly from one side of the wheel, for the convenience of the operator in manipulating the said member. Heretofore in pumps organized as above stated the air outlet has included a socket attached directly to the pump barrel and a tubular elastic coupling confined in said socket, as shown for example, by Letters Patent No. 763,707, the said socket being arranged at an obtuse angle with the barrel and communicating directly with the air-containing space in the barrel. This construction involves considerable expense, both for labor and material, it being necessary to employ a relatively expensive material such as brass tubing for the barrel and socket, and to employ special tools in forming the same, and also involves liability of leakage of air between the barrel and the coupling.

The present invention has for its object, first, to enable the socket and elastic coupling to be entirely independent of the pump barrel and to be directly connected with the piston-rod, so that the above-mentioned objections to a socket directly connected with the barrel are obviated, and secondly, to enable the barrel to be made from a straight length of tubing which may be steel, and to be located at an obtuse angle with the air outlet by the simple operation of bending the piston-rod. The invention is embodied in a pump in which the barrel is reciprocated on the piston and piston-rod, and the socket and elastic coupling are attached to the piston-rod, said rod being bent at an obtuse angle near its point of attachment to the socket, to form an elongated body portion carrying the piston, and a terminal portion carrying the socket and coupling, the axis of the said body portion and barrel being inclined relatively to the axis of said terminal portion, socket and coupling, so that when the coupling is engaged with a vertically standing tire valve, the said body portion and barrel are inclined outwardly from one side of the wheel.

Of the accompanying drawings forming a part of this specification,—

Figure 1 is a side view of the pump embodying my invention, the barrel being shown in section.

Fig. 2 is a side view of the same looking from a different point.

Fig. 3 is a section on line 3—3 of Fig. 1, the valve hereinafter referred to being closed.

Fig. 4 is a view similar to Fig. 3, showing the valve open.

Fig. 5 is a section on line 5—5 of Fig. 1.

Fig. 6 is a view partly in elevation and partly in section, at one end of the pump, the handle hereinafter referred to being omitted.

Fig. 7 is a fragmentary sectional view, showing a modification.

The same reference characters indicate the same parts in all the figures.

The piston-rod of my improved pump is an elongated metal tube bent near one of its ends to form a straight elongated barrel-grinding body portion 12, and a terminal portion 12$^a$ standing at an obtuse angle with the body portion 12, the length of the tube or piston-rod being such that the terminal portion projects from one end of the pump barrel herinafter described. To one end of the body portion 12 is attached a piston 13. To the terminal portion 12$^a$ is attached a socket adapted to confine and hold a tubular coupling 14 of elastic rubber, the bore of said coupling having a contracted portion 15, an enlarged portion 16, and a somewhat contracted mouth portion 17. The bore thus formed is adapted to receive the outer end portion of a tire valve of common construction, said valve having an externally threaded end portion adapted to enter and somewhat expand the mouth portion 17.

The coupling socket as here shown, includes a tubular head portion 18 which is internally threaded and engaged with an external thread on the terminal portion 12$^a$, and a circular socket wall which, in the embodiment of the invention here shown, is formed by a plurality of resilient fingers 19 having inwardly projecting ears 20 at their outer ends, the inner ends of said fingers being integrally connected with a sleeve 21 which is brazed or otherwise rigidly connected to the periphery of the head portion 18.

One end of the head portion 18 is formed to constitute a flat outwardly facing annular seat 22 surrounding the delivering end of the terminal portion 12$^a$, and the coupling 14 has its flat annular inner end coextensive with the seat 22 and bearing closely thereon to form an air-tight joint surrounding the air passage formed by the bore of the tubular piston-rod and by the bore of the coupling 14. The fingers 19 normally spring outward to expand the socket wall and permit the insertion of the coupling therein, means such as a sliding sleeve or collar 23 being provided for forcing the fingers inwardly and thus contracting the socket and causing the ears 20 to project under the outer end of the coupling 14.

When the coupling is engaged with an upstanding tire valve on a wheel rim, the terminal portion 12$^a$ is held in alinement with the tire valve, while the elongated body portion 12 is held at an inclination relatively to the tire valve, and is therefore inclined outwardly from one side of the wheel to permit the convenient operation of the pump.

Owing to the fact that the socket 14 is attached directly to the tubular piston-rod, the described inclination of the body portion 12 is caused by the simple operation of bending the piston-rod, to cause the body portion to stand at an obtuse angle with the terminal portion 12$^a$.

Owing to the fact that the tubular piston-rod has a flat annular seat 22 surrounding its delivering end, a tight joint is formed by the bearing on the inner end of the coupling on said seat, so that there is no liability of leakage of air outside the coupling during the operation of inflating the tire.

To prevent accidental rotation of the coupling socket and the unscrewing of the same from the terminal portion 12$^a$, I provide a lock-nut 25 engaged with the external thread of the terminal portion and bearing either against the sleeve portion 18, or as here shown, against a metal washer 26 interposed between said sleeve portion and the lock-nut.

The pump barrel 27 is made from a straight length of tubing, preferably steel, formed internally to have a sliding bearing on the piston 13 and provided at its inner end with a guide 28 having a sliding fit on the body portion 12 of the tubular piston-rod.

As shown by Figs. 1 to 6 inclusive, the outer end of the barrel may be provided with an air-conducting member having an inwardly facing valve seat and containing a spring-pressed valve which normally closes outwardly against said seat to prevent the escape of air when the barrel is being moved downwardly, said valve being adapted to open inwardly to permit air to enter the upper end of the barrel when the barrel is moved upwardly.

As shown by Figs. 1, 2, 3 and 4, the air-conducting member may include a tubular plug portion 30, inserted in and rigidly secured to the upper end portion of the barrel, and a tubular shank portion 31, secured to the plug portion 30 and having an air inlet or inlets 32, the inner end of the shank portion forming an inwardly facing valve seat 33.

34 represents a valve which is pressed outwardly by a spring 35 against the valve seat.

The shank portion 31 is externally screw-threaded at its end portions, one end being engaged with an internal thread formed in the bore of the plug portion 30. The shank portion 31 is utilized as a connection between the barrel and a handle 36, whereby the barrel may be reciprocated, one end of the shank portion being screwed into the handle as indicated by Figs. 1, 2, 3, and 4.

As shown by Fig. 6, the shank portion and handle may be omitted, and the plug 30 is provided with a bushing 37, one side of which forms the valve seat 33, said bushing being tubular, so that air is permitted to pass through it when the valve is opened.

The valved air-conducting member is preferable, when the pump is required to inflate relatively large automobile and other tires, the air being admitted to the barrel wholly through said member. If desired, however, the air may be admitted between the body portion 12 of the piston-rod and the guide 28, the air forcing its way between the internal surface of the barrel and the cupped washer of the piston when the barrel is moved upwardly, the piston preferably having a single cupped washer and the guide 28 having a loose air-admitting fit on the body portion 12, as shown by Fig. 7. When air is admitted to the outer end of the barrel as just described, the piston preferably has two cup washers and the guide 28 has a relatively loose sliding fit on the body portion 12 of the piston-rod.

My Patent 763,707, discloses a reciprocating piston and piston-rod, and a non-reciprocating barrel, one end of which is bent at an obtuse angle with the body of the barrel and forms a socket for an elastic coupling, so that the barrel stands at an obtuse angle relatively to the coupling. The structure disclosed in said patent, as heretofore stated, is open to certain objections, among which may be mentioned the following:

First, the tubing of which the barrel and socket are made necessarily has to be of a somewhat ductile metal, such as brass, so that the cost of the barrel and socket including the labor and the special tools required, is greater than the improved pump herein shown.

Secondly, it is impossible to form on the integral barrel and socket of my former patent a seat equivalent to the seat 22 as a member of an air-tight joint coöperating with the inner end of the elastic coupling.

As above stated, the inclination of the body portion 12, of the piston rod, and of the barrel 27 relatively to the terminal portion 12ᵃ and the coupling, is caused solely by bending the tube as described, and therefore involves no special construction of the barrel to produce the desired result, the coupling socket being entirely independent of the barrel and attached directly to the piston-rod.

The coupling 14 constitutes an extension of the terminal portion 12ᵃ in alinement with the latter. Said terminal portion and extension are so nearly coaxial that a downward air forcing thrust on the barrel tends to tighten the engagement of the elastic extension with the tire valve, said extension being compressed between the seat 22 and the tire valve by said thrust.

The tubular piston-rod 12 and the tubular elastic coupling 14 constitute a two-part air conduit, having a bore of substantially uniform diameter from end to end, the bore of the coupling registering with that of the rod. The bore of the two-part conduit is rendered air-tight, at the joint between said parts, by the air-forcing thrust of the pump barrel, so that leakage of air from the conduit, during said thrust, is prevented.

I claim:

1. As a new article of manufacture, a tire-inflating air pump comprising an elongated rigid tubular piston rod having its lower end portion bent relatively to the body portion thereof and at an obtuse angle, a flexible slip coupling connected to the bent end portion of the piston rod and having a bore coinciding with the bore of said piston rod, whereby when said coupling is engaged with an upstanding tire valve the body portion of the piston rod will extend outwardly from one side of and at an angle to the wheel, a plunger on the body portion of the rod, and a reciprocable pump barrel on the body portion of the rod and positioned to have a downwardly air-forcing thrust which presses the coupling and tire valve into tight relation.

2. As a new article of manufacture, a tire inflating air pump comprising an elongated and rigid tubular piston rod having its lower end portion threaded and bent at an obtuse angle with relation to the body of the rod, a flexible slip coupling threaded on said bent end and forming a continuation thereof, a nut threaded on the end of the rod above the coupling and locking the coupling on the rod, said coupling having a bore coinciding with the bore of said piston rod, whereby when said coupling is engaged with an upstanding tire valve the body portion of the piston rod will extend outwardly from one side of and at an angle to the wheel, a plunger on the body portion of the rod, and a reciprocable pump barrel on the body portion of the rod and positioned to have a downwardly air-forcing thrust which presses the coupling and tire valve into tight relation.

In testimony whereof I have affixed my signature.

HENRY K. AUSTIN.

Copies of this patent may be obtained for five cents each, by addressing the "Commissioner of Patents, Washington, D. C."